United States Patent [19]

Morinaga et al.

[11] 3,969,661

[45] July 13, 1976

[54] MOTOR CONTROL APPARATUS

[75] Inventors: Shigeki Morinaga; Kazuo Onishi; Tadashi Takahashi, all of Hitachi, Japan

[73] Assignee: Hitachi, Ltd., Japan

[22] Filed: Aug. 19, 1974

[21] Appl. No.: 498,663

[30] Foreign Application Priority Data

Aug. 20, 1973 Japan.............................. 48-92511

[52] U.S. Cl. ............................................... 318/375
[51] Int. Cl.$^2$ ........................................... H02P 3/12
[58] Field of Search ............ 318/268, 269, 369, 375

[56] References Cited
UNITED STATES PATENTS

3,694,722  9/1972  Reed................................ 318/375 X
3,860,860  1/1975  Moran et al. ........................ 318/375

*Primary Examiner*—Robert K. Schaefer
*Assistant Examiner*—W. E. Duncanson, Jr.
*Attorney, Agent, or Firm*—Craig & Antonelli

[57] ABSTRACT

A motor control apparatus is disclosed which comprises a speed control device for operating at a command speed a DC motor connected to a DC power supply, a dynamic braking device for braking the motor upon the issuance of a deceleration command, and a low-speed detector for generating a detection signal when the magnitude of the braking current of the motor is reduced below a set level. When the low-speed detector is energized, the speed control device is regulated thereby to run the motor at a predetermined low speed.

4 Claims, 10 Drawing Figures

MOTOR CONTROL APPARATUS

BACKGROUND OF THE INVENTION

1. Field of the Invention

This invention relates to a control apparatus for a DC motor, or more particularly to a speed control apparatus suitable for a DC motor for positioning control which is required to maintain a predetermined speed level during the braking and deceleration of the motor.

2. Description of the Prior Art

In the speed control of a DC motor, it is sometimes required that the motor be run at a predetermined low speed after braking and deceleration from a higher speed.

This low-speed control is necessary to stop exactly at a predetermined position a movable member of an industrial sewing machine, machine tool, elevator or the like.

As an example, explanation will be made of typical operating processes of a motor for use with the control of an industrial sewing machine with reference to the operating characteristics curve shown in FIG. 1.

Figure 1:
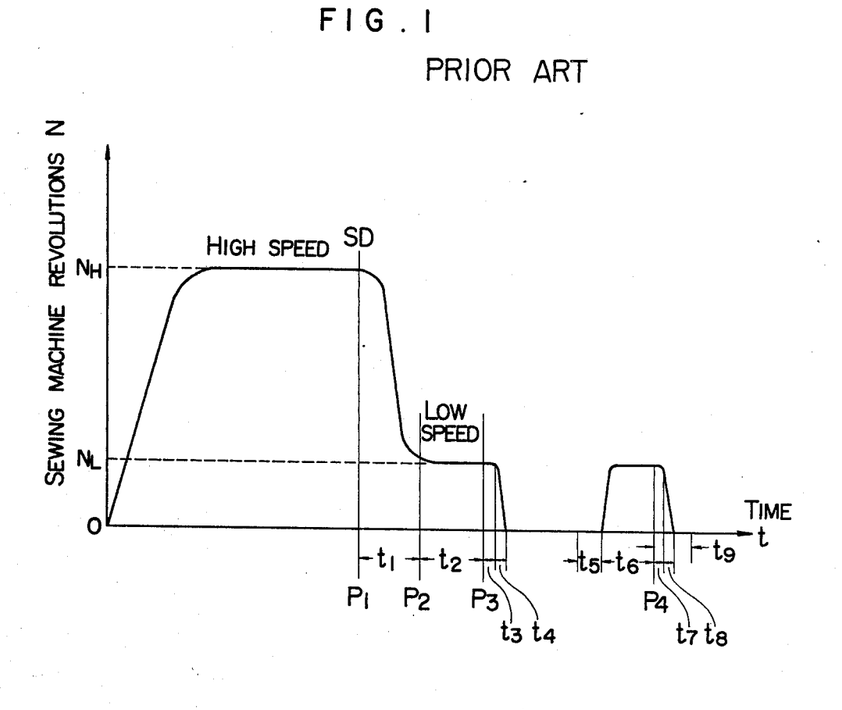
FIG. 1 is an operating characteristics diagram showing the speed control mode of the drive motor for the conventional industrial sewing machine.

In FIG. 1, the ordinate represents the number of revolutions N of the sewing machine shaft driven by the motor and the abscissa time. When the sewing machine is operating at a high speed $N_H$ after starting, the motor is released from the power supply upon the issuance of a deceleration command at point $P_1$, whereupon the braking device is energized thereby to start deceleration.

When a point $P_2$ representing a predetermined low speed $N_L$ is reached after $t_1$ seconds following the issuance of the deceleration command $P_1$, the braking action stops and the predetermined low speed $N_L$ is maintained for $t_2$ seconds for the purpose of positioning. When the sewing machine needle reaches a predetermined position, for example, a low position $P_3$, the position detector is energized thereby to acutate an electromagnetic brake.

Because of a certain time delay, however, this electromagnetic brake is energized actually after $t_3$ seconds and the sewing machine needle stops at the low position after $t_4$ seconds. In the operation of the motor having such a control mode, it is indispensable to detect that the predetermined low speed $N_L$ has been reached.

In the controlling operation of this type of motor, it will be apparent from the diagram of FIG. 1 that the motor passes through the predetermined low speed level $N_L$ at least twice during one operation mode.

For this reason, it is impossible to detect the point $P_2$ of FIG. 1 even if the rotational speed of the motor or the sewing machine is detected by a speed generator connected to the motor. In other words, it is necessary not only to detect the speed of the motor but also to decide whether the motor is accelerating or decelerating. This makes it necessary to provide a discriminator for the above-mentioned decision as well as the speed detector, thus making the sewing machine cost very high.

For the purpose of effecting the above-described control, U.S. Pat. No. 3,573,581 discloses a device for deciding whether the motor is accelerating or decelerating according to the presence or absence of a trigger pulse of a dynamic braking thyristor connected to the motor while at the same time detecting the motor speed by converting it into a number of pulses by the use of a disc with a slit.

However, this method of detecting the braking state of the motor in response to a trigger pulse applied to the braking thyristor has the disadvantages that the thyristor may not necessarily be turned ON by a trigger pulse and that the trigger pulse may be produced by mistake, thus posing the problem of lack of accuracy and reliability.

Further, when the revolutions of the motor are decreased to the predetermined low level $N_L$, the braking thyristor in parallel with the motor must be turned off to thereby terminate the dynamic braking and also the motor is required to be connected to the power supply again to run it at the predetermined low speed $N_L$, say, 400 r.p.m.

In order to terminate the dynamic braking working during the deceleration, it is necessary to provide a forced commutation device for the thyristor. Also, when the power supply circuit is closed again after ascertaining that the predetermined low motor speed has been reached, the thyristor must be in a turn-off state. Otherwise, there is the danger of the power supply being short-circuited.

SUMMARY OF THE INVENTION

Accordingly, it is an object of the invention to provide an apparatus which detects and maintains a predetermined speed during the deceleration of the motor without using any motor speed detector for directly detecting the motor speed.

Another object of the invention is to provide a detector which is not affected in any way by any erroneous production of a trigger pulse for the motor braking thyristor.

A further object of the invention is to provide an apparatus in which the thyristor connected to the motor is automatically turned off thereby to release the braking action when the predetermined low motor speed level has been reached, without using any special turn-off device with the braking thyristor.

According to the present invention, there is provided a control apparatus comprising a speed control device for running at the command speed a DC motor connected to a DC power supply, a dynamic braking device for braking and decelerating the motor, a low-speed detector for producing a detection signal when the magnitude of the current is reduced below a predetermined level during the braking of the motor, and low-speed control device for controlling the speed control device in response to an output from the low-speed detector thereby to maintain the operating condition at the predetermined low speed.

BRIEF DESCRIPTION OF THE DRAWING

FIG. 3b is a wiring diagram showing the part of the control circuit following line L-L in FIG. 3a.

(a) to (e) of FIG. 4 are diagrams for explaining the operation of the main parts of the apparatus according to the invention.

DESCRIPTION OF THE PREFERRED EMBODIMENTS

Figure 2:
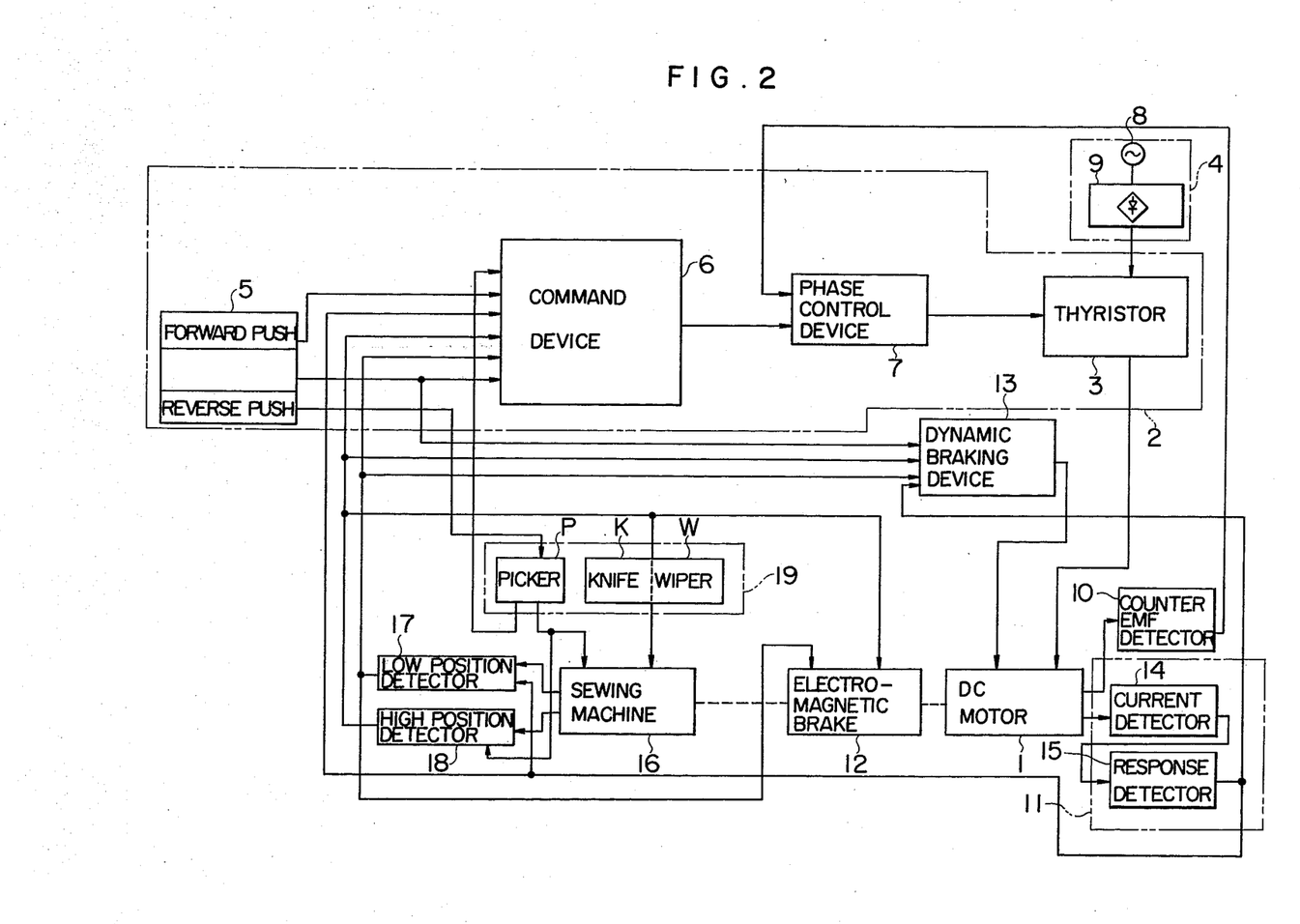
FIG. 2 is a block diagram showing the motor control apparatus embodying the present invention.

Referring to FIG. 2 showing a block diagram of an embodiment of the invention, reference numeral 1 shows a DC motor, numeral 2 a speed control device, numeral 3 a thyristor included in the speed control device 2, and numeral 4 a DC power supply to which the DC motor 1 is connected through the thyristor 3. The speed control device 2 further comprises a command device 6 for running the motor 1 at a predetermined speed in accordance with the position of the pedal 5 operated by the sewing machine operator and a phase control device 7 for controlling the firing phase angle of the thyristor 3 in response to the output from the command device.

The DC power supply means 4 comprises an AC power supply 8 of a commercial frequency and a full-wave rectifier 9 for rectifying the AC voltage from the AC power supply 8. Reference numeral 10 shows a counter electromotive force detector for detecting the counter electromotive force proportional to the speed of the motor 1. The output from the counter electromotive force detector 10 is negatively fed back to the phase control device 7 of the speed control device 2 in such a manner that the speed of the motor 1 is identical with the command speed.

Reference numeral 11 shows a low-speed detector for detecting the magnitude of the braking current of the motor 1 and which produces a signal only when the braking current is reduced below a predetermined level thereby to control the dynamic braking device 13, thus maintaining the motor 1 at a predetermined low speed level. The low-speed detector 11 comprises a current detector 14 for detecting the magnitude of the braking current flowing in the motor 1 and a response detector 15. When the braking current increases beyond a predetermined level, the current detector 14 transfers from the first output state to the second output state, whereas it changes from the second to the first output state when the braking current is reduced below a predetermined level. The response detector 15 produces an output signal only when the current detector 14 transfers from the second to the first output state.

Reference numeral 16 shows a sewing machine coupled with and driven by the motor 1, and comprises a low position detector 17 for detecting the stop position of the needle and a high position detector 18. Only at the low position of the needle of the sewing machine 16 and in the presence of the output signal from the low speed detector 11, the low position detector 17 energizes an electromagnetic braking device such as an electro-magnetic brake 12 while at the same time reducing the command level of the command device 6 to zero.

The high-position detector 18 causes the electromagnetic brake 12 to be actuated when the needle of the sewing machine 18 changes its position from the low to the high position. At the same time, the knife K and the wiper W of an automatic thread-cutting device 19 are actuated.

Further, the automatic thread cutting device 19 has a picker P which depends for its operation on the switch 135 (shown in FIG. 3b) being energized when the operator depresses the pedal 5 in a reverse position. In other words, when the operator pushes the pedal 5 to the reverse position, the picker P is actuated through the switch 135 thereby to pick up the thread, while a low-speed run command is issued to the command device 6 so that the motor 1 enters a low-speed run. In this way, as shown in FIG. 1, after the energization of the picker P for $t_5$ seconds and subsequent picking up of the thread, the motor 1 continues its low speed run for $t_6$ seconds.

After that, when the needle of the sewing machine 16 rises to the predetermined point, that is, point $P_4$ in FIG. 1, the high-position detector 18 is actuated so that the electromagnetic brake 12 is energized thereby to stop the motor 1. As a result, the needle of the sewing machine 16 stops at the high position. In the meantime, the knife K and wiper W are actuated automatically thereby to cut off and wipe away the thread as required in preparation for the subsequent operations.

The construction of the apparatus according to the invention as mentioned above will be described more in detail with reference to the wiring diagrams of FIGS. 3a and 3b.

Figure 3A:
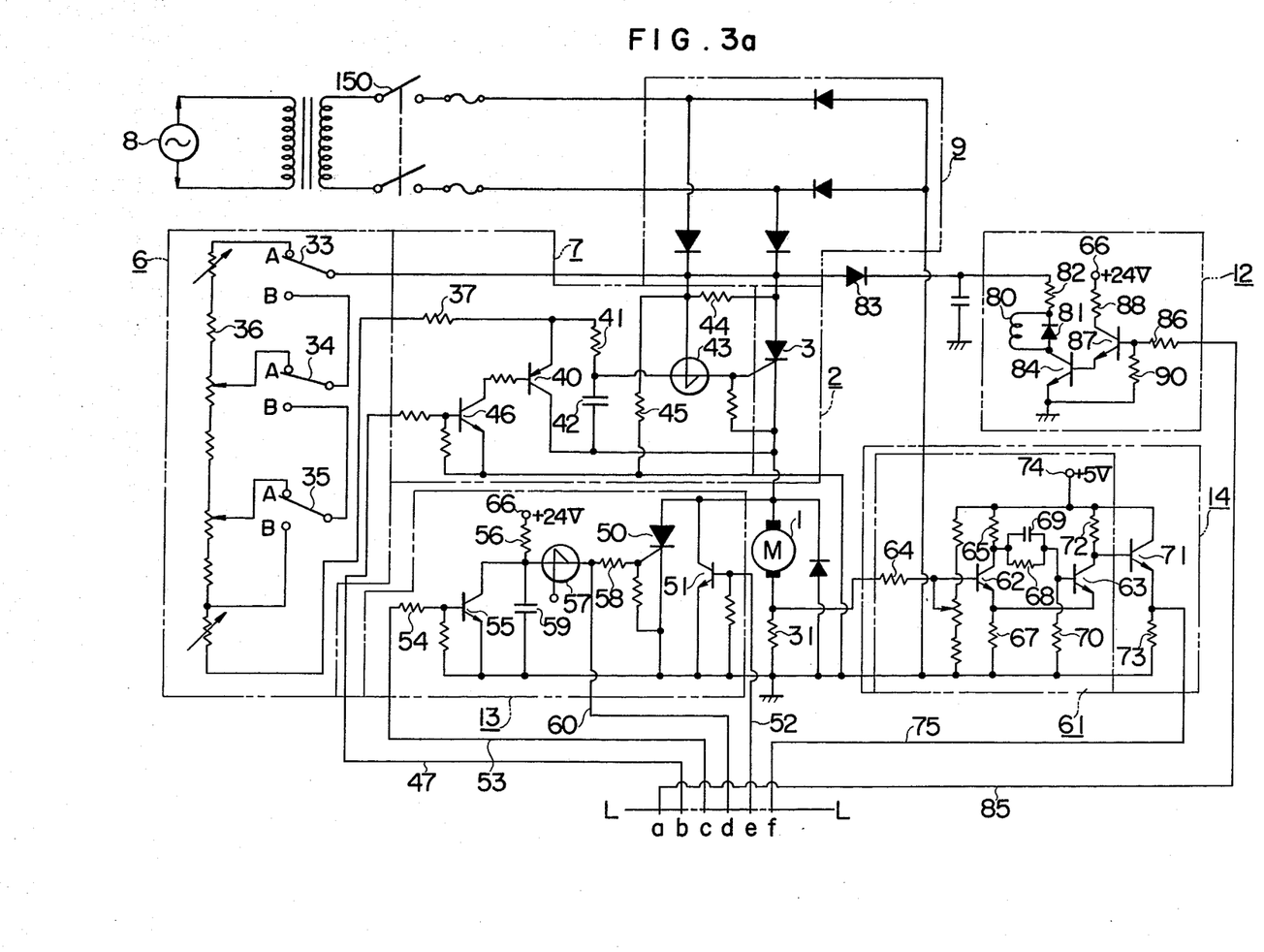
FIG. 3a is a wiring diagram showing the drive circuit employed in the apparatus according to the invention.

In FIG. 3a showing the drive circuit for the motor 1, an end of the motor 1 is connected to the output terminal of the full-wave rectifier 9 through the thyristor 3, the other end thereof being grounded through a resistor 31.

The command device 6 in the speed control device 2 comprises switches 33 to 35 operatively interlocked with the pedal 5 and series-connected resistors 36 switched by the switches 33 to 35. An end of the resistor group 36 is connected to the output terminal of the full-wave rectifier 9 through the switch 33, and the other end thereof to the resistor 37 of the phase control circuit 7.

Figure 3B:
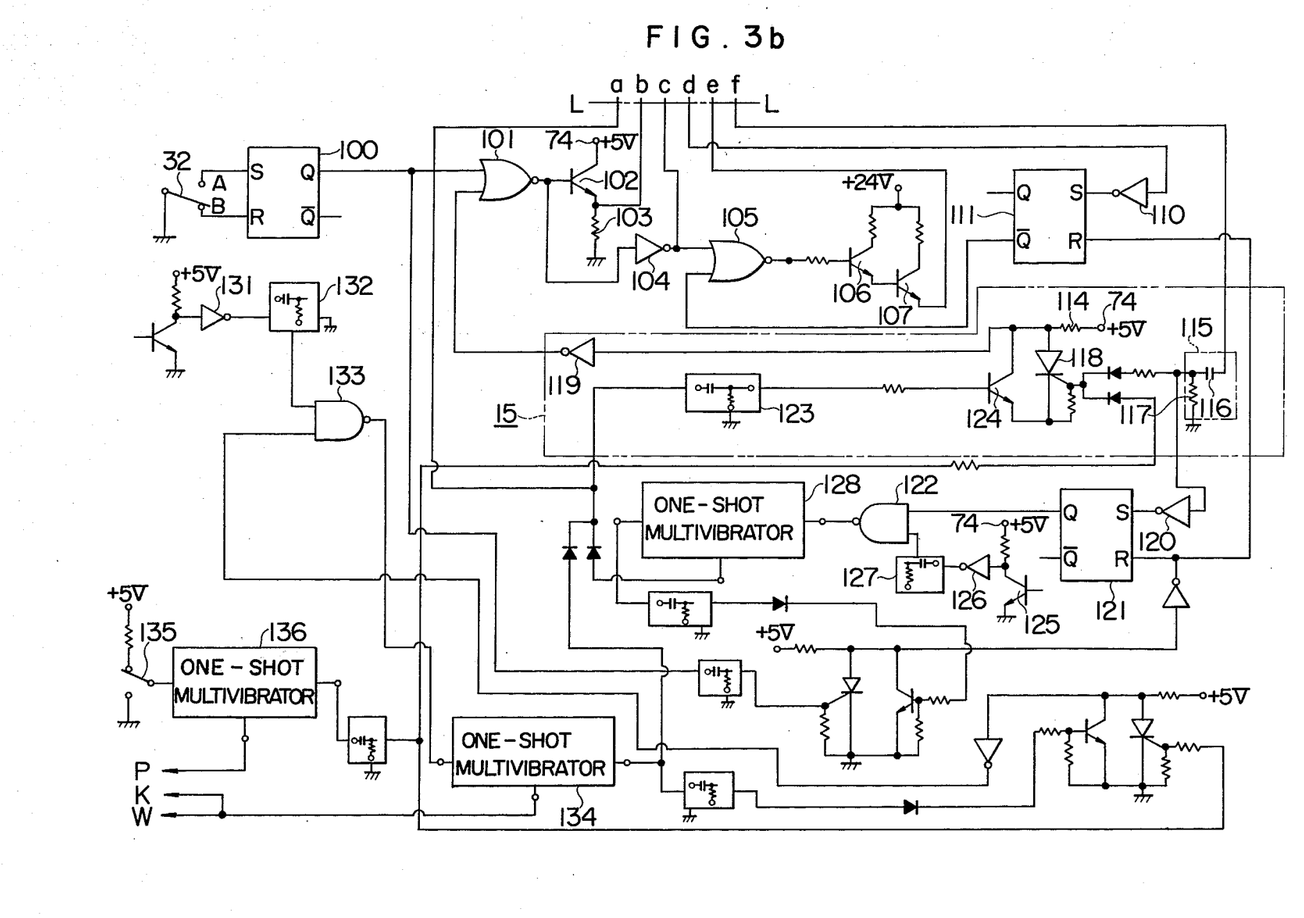

The phase control circuit 7 comprises a transistor 40 which is turned off when the terminal A of the switch 32 interlocked with the pedal 5 shown in FIG. 3b is closed, a resistor 41 connected in parallel between the emitter and collector of the transistor 40, a capacitor 42 connected in series with the resistor 41, and a unilateral negative characteristics thyristor 43 such as SUS, that is, Silicon Unilateral Switch of GE with its anode connected to the junction point of the resistor 41 and capacitor 42 and with its cathode connected to the gate of the thyristor 3. The emitter of the transistor 40 is connected to the output terminal of the command circuit 6 through the resistor 37, and the collector thereof to the cathode of the thyristor 3, the base of the transistor 40 being connected to the control line 47 through the transistor 46 in the preceding stage.

Reference numeral 44 shows a resistor connected in series with the resistor 45. The resistors 44 and 45 make up the counter electromotive force detector 10. An end of the resistor 44 is connected to the anode of the thyristor 3, and the other end thereof to an end of the resistor 31 connected in series with the motor 1 through the resistor 45. Thus, a closed loop is formed by the resistors 44, 45 and 31, the motor 1 and the thyristor 3.

The anode of the resistors 44 and 45 is connected to the gate of the unilateral negative characteristics thyristor 43.

The dynamic braking device 13 has a transistor 51 connected in parallel to a thyristor 50, which in turn is connected in parallel to the motor 1. The anode of the thyristor 50 and the collector of the transistor 51 are connected to the positive terminal of the motor 1, while the cathode of the thyristor 50 and the emitter of the transistor 51 are grounded together with an end of the resistor 31, the base of the transistor 51 being connected to the control line 52.

Reference numeral 55 shows a transistor with its base connected to the control line 53 through the resistor 54. The collector of the transistor 55 is connected through the unilateral negative characteristics thyristor 57 and the resistor 58 to the gate of the thyristor 50, while the emitter thereof is grounded. Reference numeral 59 shows a capacitor with an end thereof being connected to the anode of the unilateral negative characteristics thyristor 57 on the one hand and to the DC power supply terminal 66 of +24V through the resistor 56 on the other hand, the other end thereof being grounded.

Reference numeral 60 shows a control line connected to the cathode of the unilateral negative characteristics thyristor 57.

Reference numeral 61 shows a Schmidt circuit making up the current detector 14 of the low-speed detector 11, and numerals 62 and 63 transistors included in the Schmidt circuit 61. The base of the transistor 62 is connected through the resistor 64 to the junction point of the motor 1 and the resistor 31, while the collector thereof is connected to the DC power supply terminal 74 of +5V through the resistor 65, the emitter of the transistor 62 being grounded together with the emitter of the other transistor 63.

The base of the transistor 63, by contrast, is connected to the collector of the transistor 62 through the parallel circuit having the resistor 68 and the capacitor 69 on the one hand and grounded through the resistor 70 on the other. The collector of the transistor 63 is connected to the base of the transistor 71 and at the same time to the DC power supply terminal 74 of +5V through the resistor 72. Also, the collector of the transistor 71 is connected to the DC power supply terminal 74, and the emitter thereof to the control line 75 while at the same time being grounded through the resistor 73.

Reference numeral 80 shows a coil of the electromagnetic brake 12 which is connected in parallel to the diode 81. An end of the coil is connnected to the output terminal of the full-wave rectifier 9 through the resistor 82 and the diode 83, the other end thereof being grounded through the collector and emitter of the transistor 84.

Reference numeral 85 shows a control line for applying a signal to the electromagnetic brake 12, which is connected through the resistor 86 to the base of the transistor 87. The collector of the transistor 87 is connected to the DC power supply terminal 66 of +24V through the resistor 88, and the emitter thereof to the base of the transistor 84 connected to the coil 80. A resistor 89 is inserted between the base of the transistor 87 and the transistor 84.

Referring to FIG. 3b showing the part of the control circuit subsequent to the line L-L of FIG. 3a, reference numeral 32 shows a change-over switch with terminals A and B interlocked with the pedal 5. After the terminal A is closed, the switches 33 to 35 of FIG. 3a are operated in sequence according to the rotation of the pedal 5. The terminal A of the switch 32 is connected to the terminal S of the flip-flop 100, and the terminal B to the terminal R of the flip-flop 100.

The closing of the terminal A causes the output terminal Q of the flip-flop 100 to be changed to a high level such as 1 and the output of the NOR gate 101 to be reduced to a low level of, say 0 thus transistor 102 becomes nonconductive. The collector of the transistor 102 is connected to the DC power supply terminal 74 of +5V, while the emitter thereof is grounded through the resistor 103 on the one hand and connected to the control terminal b on the other.

Reference numeral 104 shows an inverter, the input terminal of which is connnected to the output terminal of the NOR gate 101, the output terminal of the inverter 104 being connected to the base resistor 54 of the transistor 53 through the control terminal c and the control line 53.

The output terminal of the inverter 104 is further connected to one of the input terminals of the NOR gate 105, while the output terminal of the NOR gate 105 is connected to the control terminal e through the transistors 106 and 107 thereby to control the base current of the transistor 51 connected in parallel with the motor 1.

Reference numeral 110 shows another inverter, the input terminal of which is connected to the control line 60 through the control terminal d, the output terminal thereof being connected to terminal S of the flip-flop 111. The output terminal Q of the flip-flop 111 is connected to the other of the input terminals of the NOR gate 105 in such a manner that the NOR gate 105 is controlled by the output signal from the unilateral negative characteristics thyristor 51.

Reference numeral 115 shows a differentiating circuit connected to the control line 75 through the control terminal f and comprises a capacitor 116 and a resistor 117, the output terminal of the differentiating circuit 115 being connected to the gate of the thyristor 118. The anode of the thyristor 118 is connected to the DC power supply terminal 74 at +50V through the resistor 114 on the one hand and to the other of the input terminals of the NOR gate 101 through the inverter 119 on the other.

The output terminal of the differentiating circuit 115 is further connected to terminal S of the flip-flop 121 through the inverter 120, and the output terminal Q of the flip-flop 121 is connected to a NAND gate 122 and a one-shot multivibrator 128. The output terminal of the one-shot multivibrator 128 is connected through the differentiating circuit 123 to the base of the transistor 124 connected in parallel with the thyristor 118, so that the thyristor 118 is turned off automatically by the conduction of the transistor 124.

Reference numeral 125 shows a transistor which becomes conductive only when the needle of the sewing machine 16 is at its low position. The collector of the transistor 125 is connected both to the DC power supply terminal 74 and to the other of the input terminals of the NAND gate 122 through the inverter 126 and the differentiating circuit 127. When the transistor 125 is ON and an output signal is produced at the output terminal Q of the flip-flop 121, the output of the NAND gate 122 becomes 0 so that the transistor 87 of the electromagnetic brake 12 becomes conductive by the output of the one-shot multivibrator 128.

Reference numeral 130 shows a transistor which becomes conductive only when the needle of the sewing machine 16 is at its high position. The collector of the transistor 130 is connected both to the DC power supply terminal 74 and to the NAND gate 133 through the inverter 131 and the differentiating circuit 132, so that the knife K and wiper W are controlled by the output of the output of the NAND gate 133 through the one-shot multivibrator 134.

Reference numeral 51 shows a switch controlled by the depression of the pedal 5 in the reverse direction, which switch is connected to the one-shot multivibrator 136 through which the picker P is controlled.

The operation of the apparatus according to the invention having the above described construction will be explained below.

When the power supply switch 150 connected to the AC power supply 8 is closed while at the same time closing the terminal A of the first switch 32 interlocked with the pedal 5, a 1 output is produced at the output terminal Q of the flip-flop 100 and a 0 output at the output terminal of the NOR 101, thus transistor 102 becomes nonconductive.

Both the transistors 46 and 40 controlled through the control line 47 from the control terminal b are in the off state, and therefore the capacitor 42 is charged through the switch 33, resistor group 36 and resistors 37 and 41 by the DC current rectified by the full-wave rectifier 9.

On the other hand, in view of the fact that the rectified DC voltage is applied to the anode of the thyristor 3 and the gate of the unilateral negative characteristics thyristor 43 is controlled by the resistors 44 and 45 dividing the potential of the anode of the thyristor 3, the unilateral negative characteristics thyristor 43 is turned on, with the result that the thyristor 3 is turned on thereby to start the motor 1.

Upon the subsequent forward depression of the pedal 5, the contacts of the switchs 33 to 35 are transferred from contact A to B in sequence in accordance with the amount of depression, so that the resistance value of the resistor group 36 is reduced thereby to shorten the charging time of capacitor 42.

Figure 4:
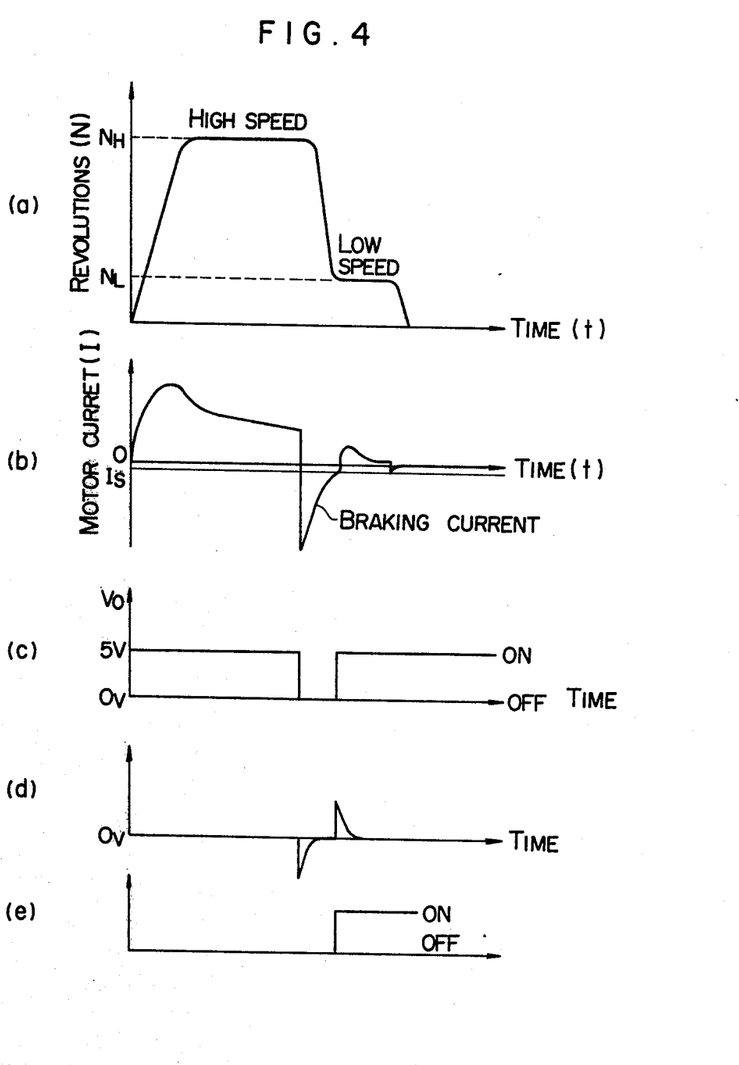

As a result, the firing phase angle of the thyristor 3 is changed in such a manner that the voltage supplied to the motor 1 is increased thereby to accelerate the motor 1 into a high speed run as shown in (a) of FIG. 4.

When the terminal B of the switch 32 is closed by operating the pedal 5, the contacts 33 to 35 of the switches operatively interlocked with the pedal 5 are closed on side A. The closing of terminal B of the switch 32 causes a 0 output to be produced at the output terminal Q of the flip-flop 100 while the output of the NOR gate 101 becomes 1, so that the transistor 102 becomes conductive thereby to energize the transistors 46 and 40 to be turned on through the control line 43.

As a result, the capacitor 42 is short-circuited by the transistor 40, and therefore the gate signal of the thyristor 3 controlled through the unilateral negative characteristics thyristor 43 disappears, thereby causing the thyristor 3 to be automatically turned off during the half cycle of the AC power supply 8.

On the other hand, the output of the NOR gate 101 is reversed through the inverter 104 and becomes 0, thereby becomes nonconductive the transistor 55 through the control line 53. Therefore, the capacitor 59 is charged by the DC power supply of +24 V through the resistor 56, and discharges suddenly through the thyristor 57 as soon as the charged voltage reaches the firing point of the unilateral negative characteristics thyristor 57.

The discharge current of the capacitor 59 causes a gate signal to be applied to the gate of the thyristor 50, whereby the thyristor 50 is turned on. It is required that the gate signal be applied to the thyristor 50 after the thyristor 3 has been turned off. This is because if the thyristor 50 begins to conduct during the energized state of the thyristor 3, the power supply 8 is liable to be short-circuited through the thyristors 3 and 50.

According to the present invention, therefore, the DC voltage obtained by rectifying the AC voltage with the full-wave rectifier 9 is used during the delay time, that is, the period of time from the turning off of the thyristor 3 to the application of a signal to the gate of the thyristor 50, so that a maximum of 10 ms (the time required for reversion of the voltage polarity) is required to turn off the thyristor 3 when a power supply frequency of 50 Hz is involved. For this reason, this delay time is set at the time required for the capacitor 59 to be charged through the resistor 56.

As the result of the energization of the unilateral negative characteristics thyristor 57, a signal produced therefrom controls the inverter 110 through the control line 60 thereby to render the output of the inverter 110 0. Therefore, the signal produced at the output terminal Q of the flip-flop 111 becomes 0, the NOR gate 105 produces a 1 signal, the transistors 106 and 107 become conductive, and the transistor 51 in parallel to the motor 1 becomes also conductive.

In this way, the energization of both the thyristor 50 and transistor 51 causes the motor 1 to be run as a DC generator, with the result that a braking current flows in the thyristor 50 and transistor 51 until the motor 1 is reduced to the predetermined low speed level through the resistor 31. The energization of the thyristor 50 causes the current in the motor 1 to be reversed as shown in (b) of FIG. 4, which current is subsequently increased as a braking current.

During the braking process of the motor 1, a voltage proportional to the revolutions of the motor 1 is generated across the resistor 31. Therefore, when the current is increased to more than the negative predetermined value Is (on the assumption that the direction of the current flow during the motor actuation is positive), the transistor 63 in the Schmidt circuit 61 of the current detector circuit 14 across the resistor 31 changes its state from OFF to ON, so that the signal at the output terminal of the current detector circuit 14 transfers from the first state of ON to the second state of OFF as shown in (c) of FIG. 4.

When the predetermined rotational speed $N_L$ ((a) of FIG. 4) of the motor 1 is reached after gradual deceleration, the braking current is reduced below the level Is as shown in (b) of FIG. 4, and therefore the voltage across the resistor 31 connected in series with the motor 1 is also reduced below the predetermined level. As a result, the transistor 62 of the Schmidt circuit 61 becomes conductive and the transistor 63 nonconductive, thus becoming conductive the transistor 71 as shown in (c) of FIG. 4.

The output of the current detector circuit 14 is applied to the response detector 15 through the control line 75 and produced only when the output of the current detector circuit 14 changes from ON to OFF.

In other words, the output of the current detector circuit 14 as shown in (c) of FIG. 4 is differentiated by the differentiating circuit 115 thereby to produce an output signal as shown in (d) of FIG. 4. The output of the differentiating circuit 115 is applied to the gate of the thyristor 118 thereby to turn on the thyristor 118, thus producing an output signal from the inverter 119 as shown in (e) of FIG. 4.

In view of the fact that this signal is generated only when the braking current of the motor 1 is reduced below the predetermined level, it indicates that the motor 1 has been decelerated and has reached the predetermined low speed of, say, 400 r.p.m.

When the thyristor 118 is turned on, the output of the inverter 119 becomes 1, which signal is applied to one of the input terminals of the NOR gate 101. The output of the NOR gate 101 becomes 0, the output of the inverter 104 is put into 1 state, and the NOR gate 105 produces a 0 signal. As a result, the transistor 102 becomes nonconductive again and the transistors 46 and 40 become also nonconductive through the control line 47, so that the capacitor 42 is charged thereby to rotate the motor 1 at the low speed.

Since the transistors 106 and 107 are OFF under this condition, the base current in the transistor 51 connected in parallel with the motor 1 is turned off. Therefore, the transistor 51 is also automatically turned off.

When the output of the current detector circuit 14 is in the second state and the low-position detecting transistor 126 is ON, the inverter 120, the flip-flop 121 and the NAND gate 122 are controlled by the output of the differentiating circuit 115, while the NAND gate 122 is controlled by the transistor 125 and the inverter 126. The output of the NAND gate 122 is applied to the oneshot multivibrator 128 thereby to control the same, while at the same time transistor 87 of the electromagnetic brake 12 becomes conductive by way of the control line 85, thus exciting the coil 80 to stop the sewing machine.

The current sharing characteristics, that is, current-voltage characteristics of the transistor 51 and the thyristor 50 connected in parallel to the motor 1 in FIG. 3a are set in such a way that when the speed of the motor 1 reaches the low speed level $N_L$, the current shared by the thyristor 50 is below the holding current thereof.

Figure 5:
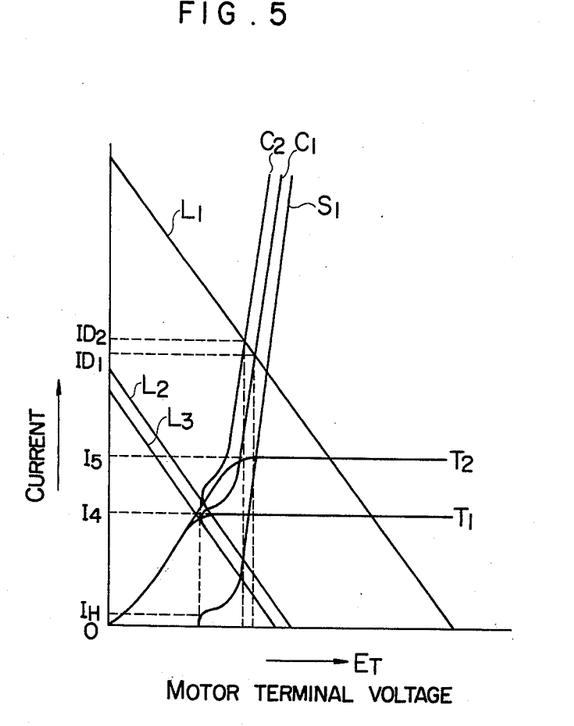
FIG. 5 is a characteristics diagram showing the currents shared by the thyristor and the transistor.

Referring to FIG. 5 illustrating the current sharing characteristics of the thyristor 50 and the transistor 51, reference symbol $S_1$ shows the voltage-current curve of the thyristor 50, symbols $T_1$ and $T_2$ the voltage-current curves of the transistor 51 for base current $I_1$ and $I_2$ respectively ($I_2 > I_1$), and symbols $C_1$ and $C_2$ composite characteristics curves in the case where the transistor 51 is connected in parallel to the thyristor 50. When the base current $I_1$ flows in the transistor 51, the voltage-current characteristic curve of the parallel circuit including the transistor 51 and the thyristor 50 is as shown by $C_1$ of FIG. 5.

Let the voltage generated by the motor 1 (which is proportional to the rotational speed thereof) be $E_C$, the internal resistance thereof $R_C$ and the braking current $I_D$. The voltage $E_T$ across the motor 1 is expressed as follows:

$$E_T = E_c - I_D \cdot R$$

As a result, the relations as shown by the load curves $L_1$, $L_2$ and $L_3$ of FIG. 5 for $n_1$, $n_2$ and $n_3$ in the revolutions of motor 1 are obtained between the voltage $E_T$ across the motor 1 and the braking current $I_D$ with the voltage $E_C$ generated by the motor 1 or the revolutions thereof as a parameter.

Now, let us consider the case in which while the motor 1 is running at a high speed of $n_1$, the unilateral negative characteristic thyristor 57 conducts thereby to produce a gate signal for the thyristor 50.

The conduction of the unilateral negative characteristic thyristor 57 causes the gate signal to be applied to the thyristor 50 through the resistor 58, thus energizing the thyristor 50 immediately.

On the other hand, the NOR gate 105 is controlled by the energized unilateral negative characteristic thyristor 57, so that the base current of the transistor 51 is controlled through the control line 52 from the transistors 106 and 107, thereby causing a collector current corresponding to the base current to flow. In other words, it will be obvious that when the speed of the motor 1 is $n_1$, the braking current $I_{D1}$ corresponding to the intersection of the load curve $L_1$ and the composite curve $C_1$ in FIG. 5 flows. (It is assumed here that the base current $I_1$ flows in the transistor 51 through the control line 52.)

Thus, the current shares of the transistor 51 and the thyristor 50 are $I_4$ and ($I_{D1} - I_4$) respectively.

The reduction in speed of the motor 1 due to the dynamic braking causes a gradual decrease in the braking current. When the speed of the motor 1 reaches the predetermined low level $n_3$, the transistor 51 takes charge of the entire current, whereas the current in the thyristor 50 is reduced below its holding current $I_H$, thereby automatically turning off the thyristor 50. After that, the transistor 51 takes charge of the full dynamic braking current for continued dynamic braking operation.

When the predetermined low speed level $N_L$ is reached, it was already explained that the dynamic braking is terminated by cutting off the base current of the transistor 51 through the transistors 106 and 107.

The turned off time of the thyristor 50 can be easily changed by changing the base current of the transistor 51. When the base current of the transistor 51 is increased from $I_1$ to $I_2$, for example, the static characteristics of the transistor 51 as shown by $T_2$ of FIG. 5 is obtained while the composite characteristics curves for the transistor 51 and the thyristor 50 changes from $C_1$ to $C_2$, with the result that the transistor 51 takes the current share $I_5$.

As a consequence, the share of current taken by the thyristor 50 is reduced below $I_H$ thereby to automatically turn off the same, when the speed of the motor 1 is reduced to $n_2$.

By regulating the base current of transistor 51 and thus changing the composite characteristics of the transistor 51 and the thyristor 50, it is possible to change the turned off time of the thyristor 50.

It will be understood from the foregoing description that according to the invention it is possible to know that the speed of the motor has been reduced to a predetermined low level merely by detecting the motor current and that the low speed level is maintained, thus eliminating the requirement for any special devices such as a speed generator.

Also, unlike the conventional apparatus in which the motor speed is detected directly by the use of a speed generator or the like device and the braking condition is detected by a braking command signal or a trigger pulse of a braking thyristor so that a low speed is detected by the combined use of these two type of signals, the apparatus according to the invention is capable of detecting the low speed directly by the braking current, thus preventing the adverse effect which otherwise might arise from an erroneous actuation.

Further, the apparatus according to the invention is such that when the motor speed is reduced to the predetermined low level, most of the braking current flows in the transistor and a current less than the holding current flows in the thyristor, thus automatically turning off the thyristor and eliminating the requirement for any special forced commutation device. In addition, the fact that the thyristor is automatically turned off at a predetermined low speed level entirely prevents the incidence of a power supply short-circuiting which otherwise might occur due to the conduction of the thyristor when the motor is connected again to the power supply to maintain the low speed run.

We claim:

1. A motor control apparatus comprising a speed control device for running at a specified speed a DC motor connected to a DC power supply, a dynamic braking device for effecting the dynamic braking of said motor when a command for decelerating said motor is issued, a low speed detector for generating a detection signal when the magnitude of the braking current due to the dynamic braking of said motor is reduced below a predetermined set point, and means for maintaining a predetermined low speed level of said motor by controlling said speed control device, said means terminating said dynamic braking upon the actuation of said low speed detector, said low speed detector including a current detector which is transferred from a first output state to a second output state when the dynamic braking current of said DC motor detected by said low speed detector is increased beyond a first set point, said current detector being transferred from said second output state to said first output state when said dynamic braking current is reduced below the predetermined set point which is a second set point having a magnitude less than that of said first set point; and a response detector for generating an output signal when said current detector is transferred from said second output state to said first output state.

2. A motor control apparatus comprising a speed control device for running at a specified speed a DC motor connected to a DC power supply, a dynamic braking device for effecting the dynamic braking of said motor when a command for decelerating said motor is issued, a low speed detector for generating a detection signal when the magnitude of the braking current due to the dynamic braking of said motor is reduced below a set point, and means for maintaining a predetermined low speed level of said motor by controlling said speed control device, said means terminating said dynamic braking upon the actuation of said low speed detector, said dynamic braking device comprises a dynamic braking thyristor connected in parallel to said motor, a transistor connected in parallel to said thyristor, means for turning on said thyristor when a command for deceleration of said motor is issued, and means for maintaining the conductive state of said transistor until the speed of said motor reaches a predetermined low level due to said deceleration command.

3. A motor control apparatus according to claim 2, in which the current sharing characteristics of said thyristor and said transistor connected in parallel to said motor are determined in such a manner that when the speed of said motor reaches said predetermined low level, the current shared by said thyristor becomes less that the holding current of said thyristor.

4. A motor control apparatus according to claim 2, in which the turned off time of said thyristor connected in parallel to said motor is capable of being changed by adjusting the base current of a transistor connected in parallel to said thyristor.

\* \* \* \* \*